US012611731B2

(12) United States Patent
Hou et al.

(10) Patent No.: US 12,611,731 B2
(45) Date of Patent: Apr. 28, 2026

(54) LASER MACHINING DEVICE AND CONTROL METHOD THEREFOR, AND COMPUTER-READABLE STORAGE MEDIUM

(71) Applicant: Makeblock Co., Ltd., Guangdong (CN)

(72) Inventors: Guangliang Hou, Guangdong (CN); Yunchao Zhou, Guangdong (CN); Youtian Zhang, Guangdong (CN); Fei Fan, Guangdong (CN); Fuming Zhang, Guangdong (CN); Hao Zhang, Guangdong (CN); Xiaocui Zhang, Guangdong (CN); Baihui Xu, Guangdong (CN)

(73) Assignee: MAKEBLOCK CO., LTD., Shenzhen (CN)

( * ) Notice: Subject to any disclaimer, the term of this patent is extended or adjusted under 35 U.S.C. 154(b) by 0 days.

(21) Appl. No.: 18/952,619

(22) Filed: Nov. 19, 2024

(65) Prior Publication Data

US 2025/0073822 A1 Mar. 6, 2025

Related U.S. Application Data

(63) Continuation of application No. PCT/CN2023/129500, filed on Nov. 3, 2023.

(30) Foreign Application Priority Data

Nov. 4, 2022 (CN) .......................... 202211378281.5

(51) Int. Cl.
*B23K 26/70* (2014.01)
*B23K 26/12* (2014.01)
*B23K 26/36* (2014.01)

(52) U.S. Cl.
CPC .................................. *B23K 26/127* (2013.01)

(58) Field of Classification Search
CPC ..... B23K 26/38; B23K 26/127; B23K 37/006
See application file for complete search history.

(56) References Cited

U.S. PATENT DOCUMENTS 5,301,347 A * 4/1994 Kensky ..................... F16P 3/08
700/267
7,723,638 B2 5/2010 Sukhman et al.
(Continued)

FOREIGN PATENT DOCUMENTS

CN 203668704 U 6/2014
CN 107438800 A 12/2017
(Continued)

OTHER PUBLICATIONS

Machine translation of JP-2017209687-A, Feb. 2025 (Year: 2025).*
(Continued)

*Primary Examiner* — Woody A Lee, Jr.
(74) *Attorney, Agent, or Firm* — Scully, Scott, Murphy & Presser, P.C.

(57) ABSTRACT

A laser machining device and a control method therefor, and a computer-readable storage medium are provided. The laser machining device has a machining space defined therein. The laser machining device includes a blocking member, a machine body, and a locking unit. The machine body is configured to perform a machining task. The locking unit is disposed on at least one of the machine body or the blocking member. The blocking member is switchable between an open state and a closed state when the locking unit is in an unlocked state. The blocking member is in the closed state when the locking unit is in a locked state. The control method includes the following: controlling the locking unit to be in the unlocked state or the locked state, according to a state of the blocking member detected by a first sensor and/or a progress state of the machining task.

24 Claims, 9 Drawing Sheets

(56) References Cited

U.S. PATENT DOCUMENTS

| | | | | |
|---|---|---|---|---|
| 2008/0017620 A1* | 1/2008 | Sukhman | ............. | B23K 26/702 |
| | | | | 219/121.86 |
| 2011/0185778 A1 | 8/2011 | Miyamoto et al. | | |
| 2011/0220623 A1* | 9/2011 | Beutler | ............. | B23K 26/0884 |
| | | | | 219/121.67 |
| 2019/0099834 A1 | 4/2019 | Bunz et al. | | |
| 2019/0255649 A1* | 8/2019 | Kurosaki | ........... | B23K 26/0622 |
| 2019/0286106 A1* | 9/2019 | Goldsmith | ........... | G05B 19/402 |

FOREIGN PATENT DOCUMENTS

| | | | |
|---|---|---|---|
| CN | 110315379 A | | 10/2019 |
| CN | 209804034 U | | 12/2019 |
| CN | 211818716 U | | 10/2020 |
| CN | 215757616 U | | 2/2022 |
| CN | 114434222 A | | 5/2022 |
| JP | H11274608 A | * | 10/1999 |
| JP | 2014113669 A | | 6/2014 |
| JP | 2017209687 A | * | 11/2017 |
| JP | 2017226014 A | * | 12/2017 |

OTHER PUBLICATIONS

Machine translation of JPH11-274,608-A, Feb. 2025 (Year: 2025).*

Machine translation of Abstract of JP-2017,226,014-A, May 2025 (Year: 2025).*

JP 2017209687 translation (Year: 2017).*

International Search Report dated Feb. 6, 2024 issued in PCT/CN2023/129500.

Chinese First Office Action dated Jun. 1, 2024 issued in CN 202211378281.5.

Chinese Second Office Action dated Sep. 11, 2024 issued in CN 202211378281.5.

Extended European Search Report issued in corresponding EP application No. 23885074.7 dated Sep. 16, 2025.

* cited by examiner

1005

A

10

A

1004

1006

1313

131 1312

1311

10

132

1321

M

10

M

1003

M–M

B

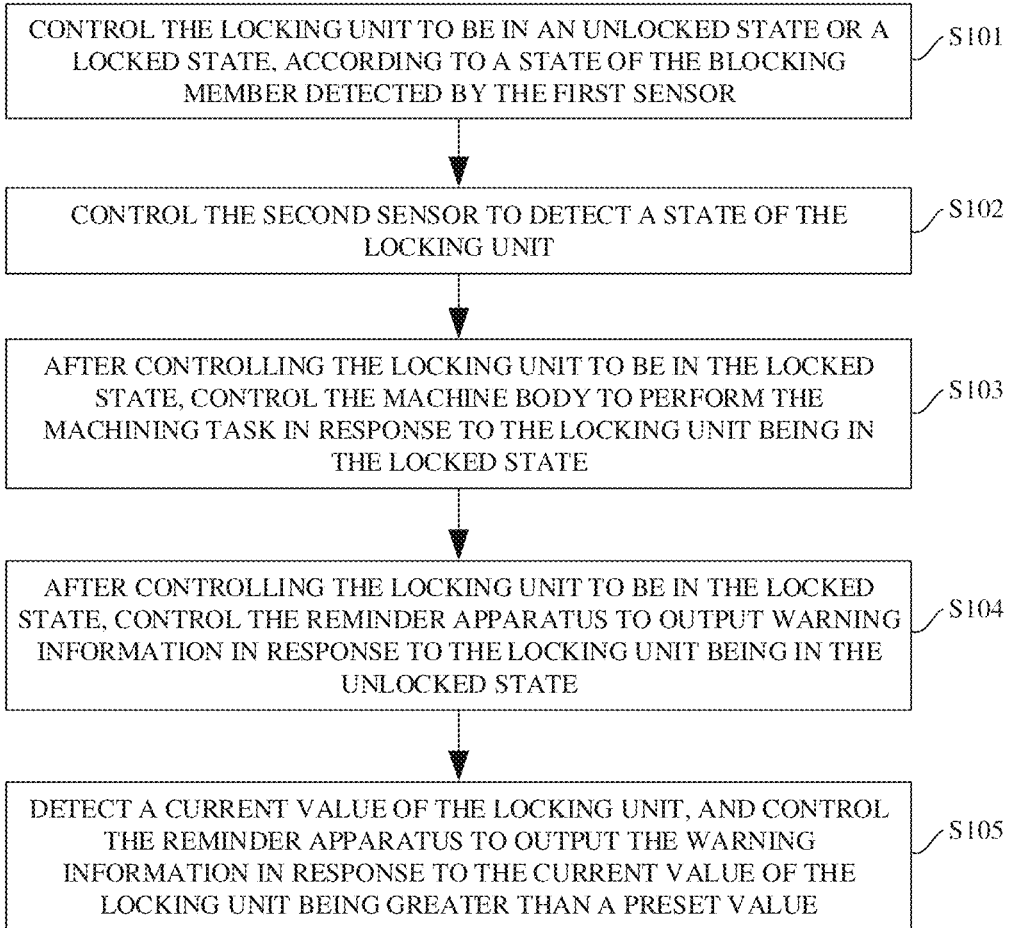

CONTROL THE LOCKING UNIT TO BE IN AN UNLOCKED STATE OR A LOCKED STATE, ACCORDING TO A STATE OF THE BLOCKING MEMBER DETECTED BY THE FIRST SENSOR — S101

CONTROL THE SECOND SENSOR TO DETECT A STATE OF THE LOCKING UNIT — S102

AFTER CONTROLLING THE LOCKING UNIT TO BE IN THE LOCKED STATE, CONTROL THE MACHINE BODY TO PERFORM THE MACHINING TASK IN RESPONSE TO THE LOCKING UNIT BEING IN THE LOCKED STATE — S103

AFTER CONTROLLING THE LOCKING UNIT TO BE IN THE LOCKED STATE, CONTROL THE REMINDER APPARATUS TO OUTPUT WARNING INFORMATION IN RESPONSE TO THE LOCKING UNIT BEING IN THE UNLOCKED STATE — S104

DETECT A CURRENT VALUE OF THE LOCKING UNIT, AND CONTROL THE REMINDER APPARATUS TO OUTPUT THE WARNING INFORMATION IN RESPONSE TO THE CURRENT VALUE OF THE LOCKING UNIT BEING GREATER THAN A PRESET VALUE — S105

FIG. 8

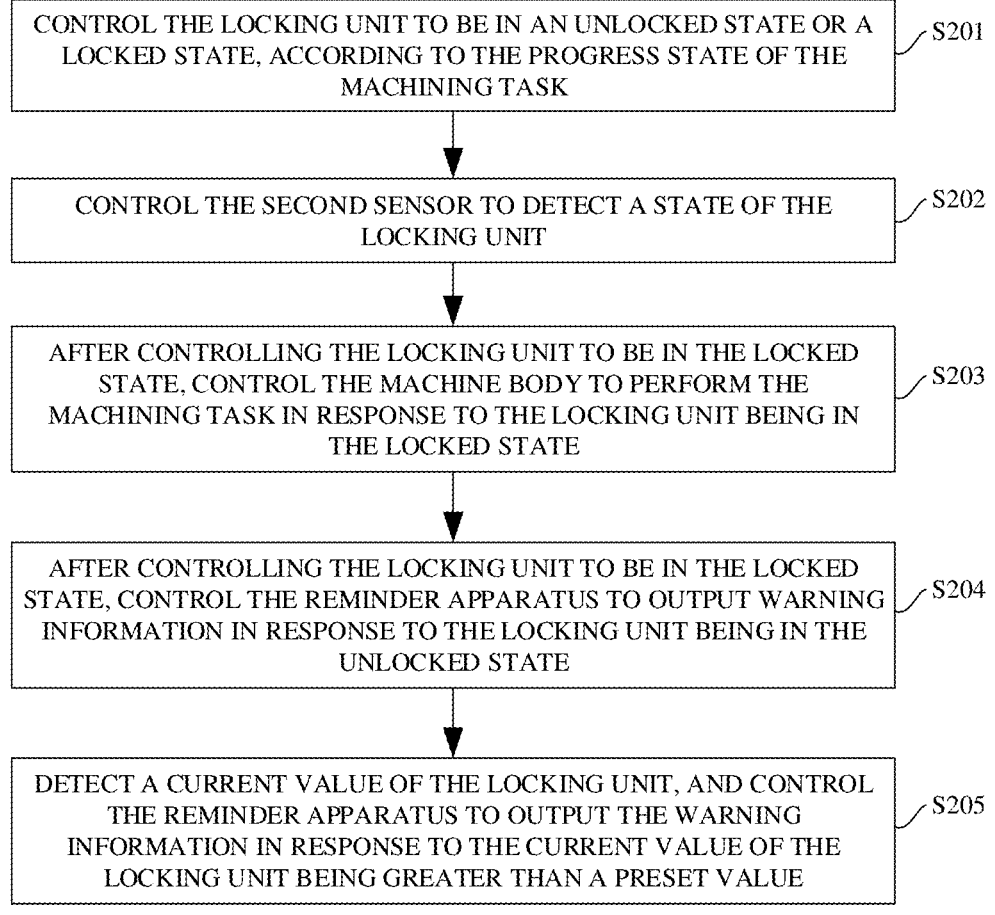

CONTROL THE LOCKING UNIT TO BE IN AN UNLOCKED STATE OR A LOCKED STATE, ACCORDING TO THE PROGRESS STATE OF THE MACHINING TASK                    S201

CONTROL THE SECOND SENSOR TO DETECT A STATE OF THE LOCKING UNIT                    S202

AFTER CONTROLLING THE LOCKING UNIT TO BE IN THE LOCKED STATE, CONTROL THE MACHINE BODY TO PERFORM THE MACHINING TASK IN RESPONSE TO THE LOCKING UNIT BEING IN THE LOCKED STATE                    S203

AFTER CONTROLLING THE LOCKING UNIT TO BE IN THE LOCKED STATE, CONTROL THE REMINDER APPARATUS TO OUTPUT WARNING INFORMATION IN RESPONSE TO THE LOCKING UNIT BEING IN THE UNLOCKED STATE                    S204

DETECT A CURRENT VALUE OF THE LOCKING UNIT, AND CONTROL THE REMINDER APPARATUS TO OUTPUT THE WARNING INFORMATION IN RESPONSE TO THE CURRENT VALUE OF THE LOCKING UNIT BEING GREATER THAN A PRESET VALUE                    S205

FIG. 9

LASER MACHINING DEVICE AND CONTROL METHOD THEREFOR, AND COMPUTER-READABLE STORAGE MEDIUM

CROSS-REFERENCE TO RELATED APPLICATION(S)

This application is a continuation of International Application No. PCT/CN2023/129500, filed Nov. 3, 2023, which claims priority to Chinese Patent Application No. 202211378281.5, filed Nov. 4, 2022, the entire disclosures of which are incorporated herein by reference.

TECHNICAL FIELD

This disclosure relates to the field of laser machining technology, and in particular to a laser machining device and a control method therefor, and a computer-readable storage medium.

BACKGROUND

Laser machining devices use laser light as machining medium to machine. The laser machining device has a machining space defined therein. When the laser machining device is in use, in order to prevent high-energy laser light emitted by a movable mechanical component or a laser assembly in the machining space of the laser machining device from spilling over and hurting people, the laser machining device is additionally provided with an openable cover plate to close the machining space.

The foregoing solutions are only information about the background related to the present disclosure as understood by the inventor, and do not constitute an admission of the related art.

SUMMARY

In a first aspect, a control method for a laser machining device is provided in implementations of the present disclosure. The laser machining device has a machining space defined therein. The laser machining device includes a blocking member, a machine body, and a locking unit. The machine body is configured to perform a machining task. The machining space is defined by the machine body and the blocking member. The blocking member has an open state and a closed state. The locking unit is disposed on at least one of the machine body or the blocking member. The locking unit has an unlocked state and a locked state. The blocking member is switchable between the open state and the closed state when the locking unit is in the unlocked state. The blocking member is in the closed state when the locking unit is in the locked state. The control method includes the following. The locking unit is controlled to be in the unlocked state or the locked state, according to a state of the blocking member detected by a first sensor and/or a progress state of the machining task.

In a second aspect, a laser machining device is provided in implementations of the present disclosure. The laser machining device has a machining space defined therein. The laser machining device includes a blocking member, a machine body, a first sensor, a locking unit, and a processor. The blocking member has an open state and a closed state. The machine body is configured to perform a machining task. The machining space is defined by the machine body and the blocking member. The first sensor is disposed on the machine body and configured to detect whether the blocking member is in the open state or the closed state. The locking unit is disposed on at least one of the machine body or the blocking member. The locking unit has an unlocked state and a locked state. The blocking member is switchable between the open state and the closed state when the locking unit is in the unlocked state. The blocking member is in the closed state when the locking unit is in the locked state. The processor is electrically connected to the first sensor and the locking unit. The processor is configured to control the locking unit to be in the unlocked state or the locked state, according to a state of the blocking member detected by a first sensor and/or a progress state of the machining task.

In a third aspect, a non-transitory computer-readable storage medium is provided in embodiments of the present disclosure. The storage medium is configured to store at least one program instruction or code. When the at least one program instruction or code is loaded and executed by a processor, the at least one program instruction or code enables a computer to implement controlling the locking unit to be in the unlocked state or the locked state, according to a state of the blocking member detected by a first sensor and/or a progress state of the machining task.

BRIEF DESCRIPTION OF THE DRAWINGS

To describe the technical solutions in implementations of the present disclosure more clearly, the following briefly introduces the accompanying drawings required for describing the implementations. Apparently, the accompanying drawings in the following description show merely some implementations provided in the implementations of the present disclosure, and persons of ordinary skill in the art may still derive other drawings from these accompanying drawings without creative efforts.

FIG. 8 is a flowchart of a control method for a laser machining device provided in an implementation of the present disclosure.

FIG. 9 is a flowchart of a control method for a laser machining device provided in another implementation of the present disclosure.

DETAILED DESCRIPTION

Figure 1:
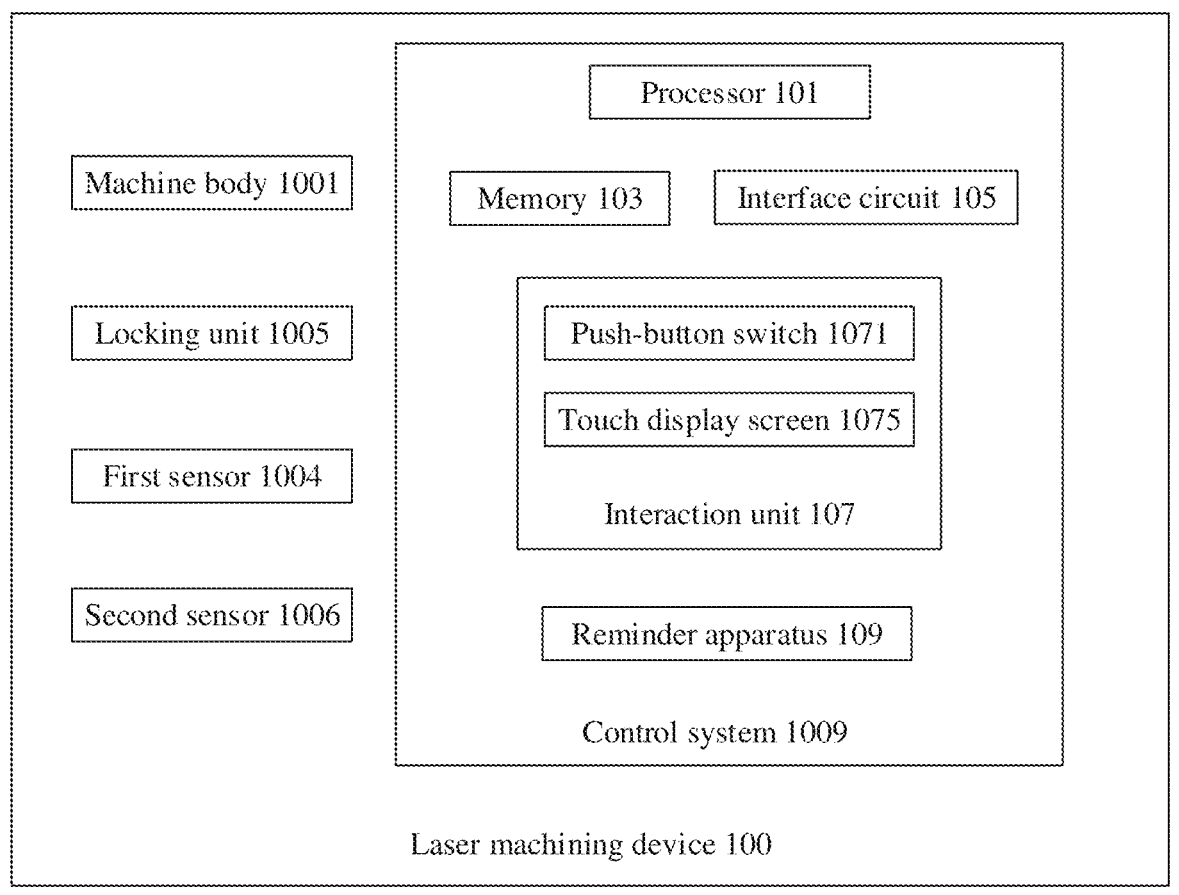
FIG. 1 is a structural block diagram of a laser machining device provided in an implementation of the present disclosure.

Although a laser machining device in the related art is additionally provided with the cover plate for closing the machining space, a user can still open the cover plate freely during laser machining. In this way, during laser machining, if the user opens the cover plate, the laser light emitted by the laser assembly may hurt the user around the laser machining device to a certain extent, which may affect the health of the user.

With regard to shortcomings in the related art, the present disclosure provides a laser machining device and a control method therefor, and a computer-readable storage medium, which can improve the safety.

In a first aspect, a control method for a laser machining device is provided in implementations of the present disclosure. The laser machining device has a machining space defined therein. The laser machining device includes a blocking member, a machine body, and a locking unit. The machine body is configured to perform a machining task. The machining space is defined by the machine body and the blocking member. The blocking member has an open state and a closed state. The locking unit is disposed on at least one of the machine body or the blocking member. The locking unit has an unlocked state and a locked state. The blocking member is switchable between the open state and the closed state when the locking unit is in the unlocked state. The blocking member is in the closed state when the locking unit is in the locked state. The control method includes the following. The locking unit is controlled to be in the unlocked state or the locked state, according to a state of the blocking member detected by a first sensor and/or a progress state of the machining task.

When the locking unit is in the locked state, the blocking member is in the closed state, that is, the blocking member cannot be opened by a user. In this way, a risk that the blocking member is opened by the user during laser machining by the laser machining device and thus the laser light spills over the machining space is reduced, so that the safety of the laser machining device during machining is improved.

According to the state of the blocking member detected by the first sensor and the progress state of the machining task, the locking unit is automatically controlled to be in the unlocked state or the locked state, so that the intelligence and automation of laser machining are improved.

The state of the locking unit is controlled according to the progress state of the machining, rather than according to the sensor detection, so that the structure of the laser machining device can be simplified.

With reference to the first aspect, in a possible implementation of the present disclosure, controlling the locking unit to be in the unlocked state or the locked state, according to the state of the blocking member detected by the first sensor, includes the following. The locking unit is controlled to be in the locked state, in response to the state of the blocking member being the closed state.

The first sensor automatically detects that the blocking member is in the closed state, and the locking unit is controlled to be in the locked state. Therefore, the precise control can be realized, and a situation that the user misjudges that the blocking member is closed but actually opened is avoided, thereby further improving the safety of laser machining.

With reference to the first aspect, in a possible implementation of the present disclosure, controlling the locking unit to be in the unlocked state or the locked state, according to the progress state of the machining task includes the following. The locking unit is controlled to be in the unlocked state, in response to the progress state of the machining task being any one of a pause state, a stop state, and a complete state.

If the progress state of the machining task is any one of the pause state, the stop state, and the complete state, the locking unit is automatically controlled to be in the unlocked state, so that the user can conveniently open the blocking member to view the laser machining device and a workpiece.

With reference to the first aspect, in a possible implementation of the present disclosure, controlling the locking unit to be in the unlocked state or the locked state, according to the state of the blocking member detected by the first sensor and the progress state of the machining task includes the following. The locking unit is controlled to be in the locked state, in response to the state of the blocking member being the closed state and the progress state of the machining task being a continue state.

If the state of the blocking member is the closed state and the progress state of the machining task is the continue state, that is, on condition that the machine body needs to continue to perform the machining task, the locking unit is controlled to be in the unlocked state, thereby facilitating machining.

With reference to the first aspect, in a possible implementation of the present disclosure, after controlling the locking unit to be in the locked state, the control method further includes the following. A second sensor is controlled to detect a state of the locking unit. The machine body is controlled to perform the machining task, in response to the locking unit being in the locked state. A reminder apparatus is controlled to output warning information, in response to the locking unit is in the unlocked state.

When the locking unit is not locked, there is a risk that the blocking member may be easily opened. The machine body is controlled to perform the machining task after the second senor detects that the locking unit is in the locked state. Therefore, a possibility that the machine body starts to perform the machining task when the locking unit is not locked is reduced, thereby further improving the safety of laser machining.

After the locking unit is controlled to be in the locked state, if the locking unit is in the unlocked state, which means that the locking unit is abnormal, the warning information is output by the reminder apparatus to remind the user that the locking unit is abnormal.

With reference to the first aspect, in a possible implementation of the present disclosure, the control method further includes the following. A current value of the locking unit is detected. The reminder apparatus is controlled to output the warning information, in response to the current value of the locking unit being greater than a preset value.

After the locking unit is controlled to be in the locked state, if the current value of the locking unit is greater than the preset value, which means that the locking unit is abnormal, the warning information is output by the reminder apparatus to remind the user that the locking unit is abnormal.

In a second aspect, a laser machining device is provided in implementations of the present disclosure. The laser machining device has a machining space defined therein. The laser machining device includes a blocking member, a machine body, a first sensor, a locking unit, and a processor. The blocking member has an open state and a closed state. The machine body is configured to perform a machining task. The machining space is defined by the machine body and the blocking member. The first sensor is disposed on the machine body and configured to detect whether the blocking member is in the open state or the closed state. The locking unit is disposed on at least one of the machine body or the blocking member. The locking unit has an unlocked state and a locked state. The blocking member is switchable between the open state and the closed state when the locking unit is in the unlocked state. The blocking member is in the closed state when the locking unit is in the locked state. The processor is electrically connected to the first sensor and the locking unit. The processor is configured to implement the foregoing control method.

With reference to the second aspect, in a possible implementation of the present disclosure, the laser machining device further includes an interaction unit connected to both the processor and the machine body. The interaction unit is used for a user to trigger a machining instruction. The processor is further configured to control the progress state of the machining progress according to the machining instruction.

By means of the interaction unit, the interaction between the laser machining device and the user is realized, thereby improving the use convenience of the laser machining device.

With reference to the second aspect, in a possible implementation of the present disclosure, the machine body includes a workbench and a machining housing. An opening is defined on the machining housing. The blocking member in the closed state fully covers the opening. The laser machining device further includes a second sensor. The second sensor is electrically connected to the processor and configured to detect whether the locking unit is in the unlocked state or the locked state.

The workbench and the machine housing are provided in a split manner, which facilitates the manufacturing and transportation of the laser machining device, and also facilitates the maintenance and replacement of the workbench and the machine housing. By providing the second sensor, the state of the locking unit is detected in real time to determine whether the locking unit is in the unlocked state or the locked state. If the locking unit is in the abnormal state, the abnormal locking unit can be found in time.

With reference to the second aspect, in a possible implementation of the present disclosure, the locking unit includes a first locking portion and a second locking portion that are movable relative to each other. The first locking portion is disposed on the machine body. The second locking portion is disposed on the blocking member. A position to which the first locking portion moves relative to the second locking portion includes an unlocked position and a locked position. The locking unit is in the unlocked state, in response to the first locking portion moving relative to the second locking portion to the unlocked position. The locking unit is in the locked state and the blocking member is closed at the machine body, in response to the first locking portion moving relative to the second locking portion to the locked position.

By means of the relative movement of the first locking portion relative to the second locking portion, the locking unit is switched between the unlocked state and the locked state, and the structure is simple.

With reference to the second aspect, in a possible implementation of the present disclosure, the first locking portion includes a driving body and a retractable rod connected to the driving body. The driving body is fixed to the machine body. The driving body is configured to drive the retractable rod to move towards or away from the second locking portion. The second locking portion includes a locking hole defined on the blocking member. A position to which the retractable rod moves relative to the second locking portion includes the unlocked position and the locked position. At least a part of the retractable rod passes into the locking hole and the locking unit is in the locked state, in response to the retractable rod extending to the locked position. The locking unit is in the unlocked state, in response to the retractable rod retracting to the unlocked position.

The locking unit may be a limiting switch which drives the retractable rod to move retractably, so that the locking unit is rapidly switched between the unlocked state and the locked state, and the movement precision is high.

When the locking unit is in the locked state, the at least the part of the retractable rod passes through the locking hole, and is limited by the locking hole, so that the possibility that the retractable rod is separated from the blocking member is reduced.

In a third aspect, a non-transitory computer-readable storage medium is provided in embodiments of the present disclosure. The storage medium is configured to store at least one program instruction or code. When the at least one program instruction or code is loaded and executed by a processor, the at least one program instruction or code enables a computer to implement the foregoing control method.

Figure 2:
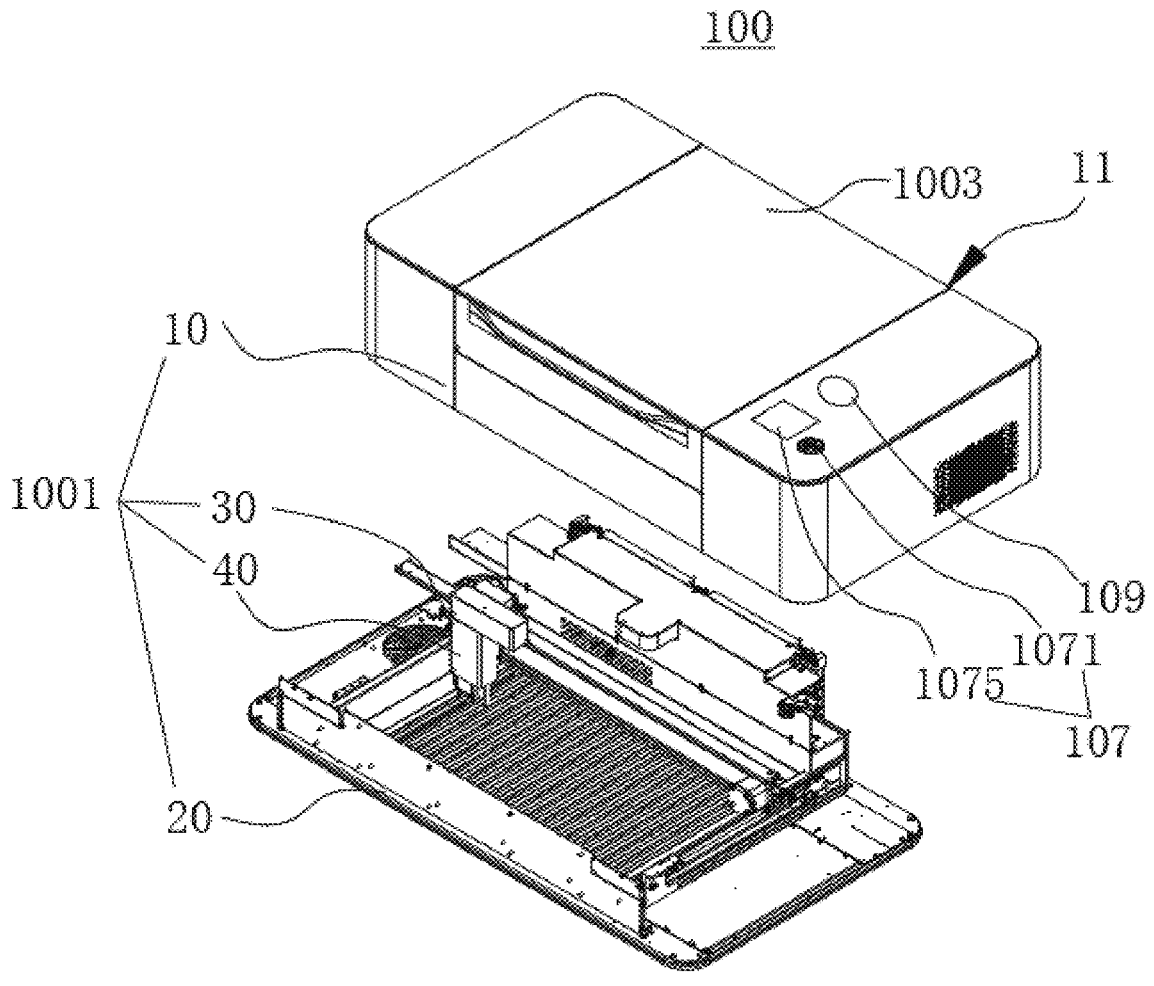
FIG. 2 is an exploded schematic perspective diagram of a laser machining device provided in an implementation of the present disclosure.

Referring to FIG. 1 and FIG. 2, a laser machining device 100 provided in an implementation of the present disclosure machines a workpiece (not shown in the drawings) by using laser light as a machining medium. Machining processes include, but are not limited to, cutting, engraving, indentation, etc. In this implementation, the laser machining device 100 is a desktop laser cutting machine. In other implementations, the laser machining device 100 includes, but is not limited to, other laser machining apparatuses, which is not limited in the present disclosure.

The laser machining device 100 has a machining space defined therein. The laser machining device 100 includes a machine body 1001, a blocking member 1003, a first sensor 1004, a locking unit 1005, a second sensor 1006, and a control system 1009. The machine body 1001, the first sensor 1004, the locking unit 1005, and the second sensor 1006 are respectively in communication connection with the control system 1009.

The machine body 1001 is configured to perform a machining task. The blocking member 1003 has a closed state and an open state. The first sensor 1004 is disposed on the machine body 1001, and is configured to detect whether the blocking member 1003 is in the open state or the closed state. The locking unit 1005 is disposed on at least one of the machine body 1001 or the blocking member 1003. The locking unit 1005 has an unlocked state and a locked state. The blocking member 1003 is switchable between the open state and the closed state when the locking unit 1005 is in the unlocked state. The blocking member 1003 is in the closed state when the locking unit 1005 is in the locked state. The second sensor 1006 is configured to detect a state of the locking unit 1005. The control system 1009 is configured to control a machining progress of the machine body 1001 according to a state of the blocking member 1003 detected by the first sensor 1004 and the state of the locking unit 1005 detected by the second sensor 1006.

It can be understood that in other implementations of the present disclosure, the second sensor 1006 may be omitted.

The machining space is defined by the machine body 1001 and the blocking member 1003. The machining space being defined by the machine body 1001 and the blocking member 1003 means that the machine body 1001 and the blocking member 1003 can cooperatively define the machining space.

The blocking member 1003 is movable relative to the machine body 1001, so that the blocking member 1003 is switchable between the closed state and the open state. When the blocking member 1003 is closed at the machine body 1001, the blocking member 1003 is in the closed state, and the blocking member 1003 and the machine body 1001 cooperatively define the machining space. When the blocking member 1003 is opened relative to the machine body 1001, the blocking member 1003 is in the open state.

The blocking member 1003 being in the closed state means that the machine body 1001 is closed by the blocking member 1003. When the blocking member 1003 is in the closed state, the machining space defined by the machine body 1001 and the blocking member 1003 is a closed space, so that laser light is prevented from spilling over (emission) the machining space when the laser machining device 100 performs laser machining. Therefore, the risk that the user around the laser machining device 100 is injured by the laser light is reduced, thereby improving the machining safety of the laser machining device 100.

The blocking member 1003 being in the open state means that the blocking member 1003 is opened relative to the machine body 1001. When the blocking member 1003 is in the open state, if the laser machining device 100 performs laser machining, the laser light will spill over into the space out of the machine body 1001.

In this implementation, the machine body 1001 includes a machine housing 10, a workbench 20, a rail apparatus 30, and a laser machining apparatus 40. The machine housing 10 is disposed on the workbench 20. The workbench 20 is used for carrying a workpiece. The rail apparatus 30 is disposed on the workbench 20. The laser machining apparatus 40 is disposed on the rail apparatus 30, and configured to perform laser machining on the workpiece. Laser machining apparatus 40 is movable relative to the rail apparatus 30. The rail apparatus 30 is movable relative to the workbench 20. The machine housing 10 and the workbench 20 are provided in a split manner, which facilitates the manufacturing and transportation of the laser machining device 100, and also facilitates the maintenance and replacement of the workbench 20 and the machine housing 10.

The machine housing 10 defines an opening 11 for easy access to the workpiece, etc. The machine housing 10 and the workbench 20 may be provided in an integrated manner or a split manner. In this implementation, the blocking member 1003 is rotatably connected to the machine housing 10, so that the blocking member 1003 is openable relative to the machine housing 10. When the blocking member 1003 fully covers the opening 11, the blocking member 1003 is closed at the machine body 1001, and the blocking member 1003, the machine housing 10, and the workbench 20 cooperatively define the machining space. When the blocking member 1003 covers the opening 11, the blocking member 1003 is in the closed state. When the blocking member 1003 does not cover the opening 11, the blocking member 1003 is in the open state. It can be understood that, a connection manner between the blocking member 1003 and the machine housing 10 is not limited to a rotational connection, for example, the blocking member 1003 is slidably connected to the machine housing 10.

It can be understood that, the workbench 20 and the rail apparatus 30 may be omitted, the workpiece is carried on a carrying surface (such as a desktop or a floor). The machine housing 10 is placed on the carrying surface. The machine housing 10 and the blocking member 1003 cooperatively define a machining space. The laser machining apparatus 40 is configured to perform laser machining on the workpiece.

The first sensor 1004 is disposed on the machine housing 10 of the machine body 1001. In this implementation, the first sensor 1004 is a Hall sensor. The first sensor 1004 is disposed on the machine housing 10. In other implementations of the present disclosure, the first sensor 1004 may also be a photoelectric sensor or the like. The first sensor 1004 can automatically monitor the state of the machine body 1001, thereby improving the automation degree and intelligence of the laser machining device 100.

Figure 3:
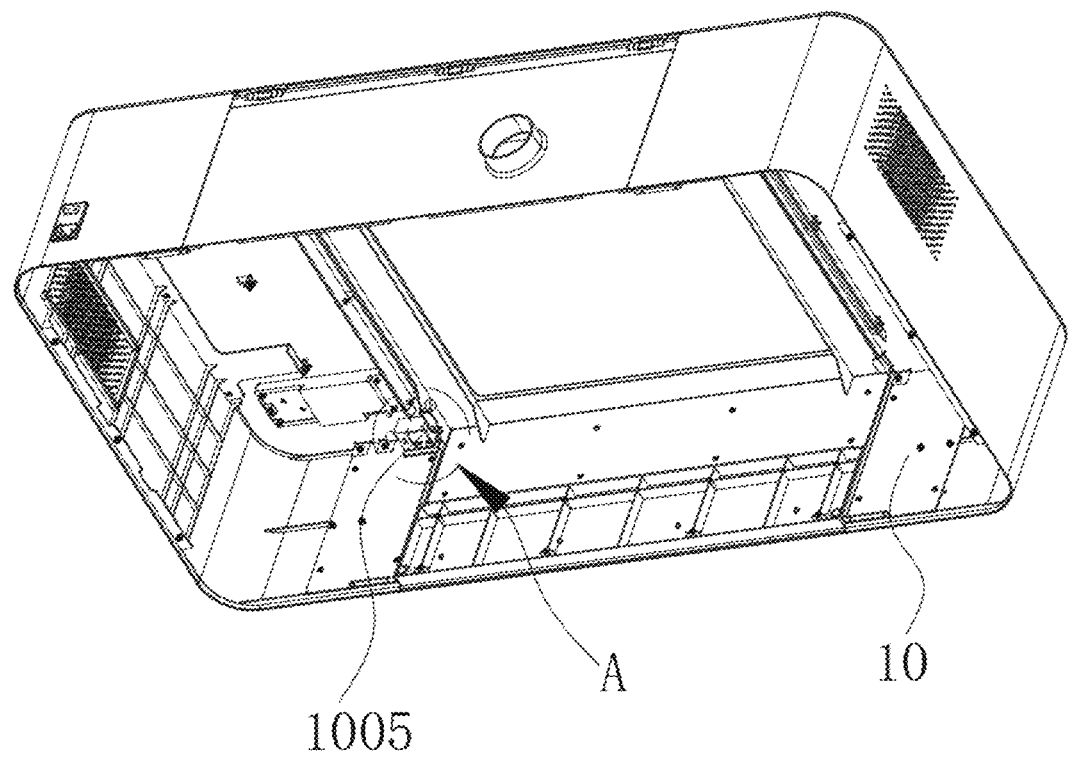
FIG. 3 is a schematic perspective diagram of a machine housing of the laser machining device illustrated in FIG. 2.
Figure 4:
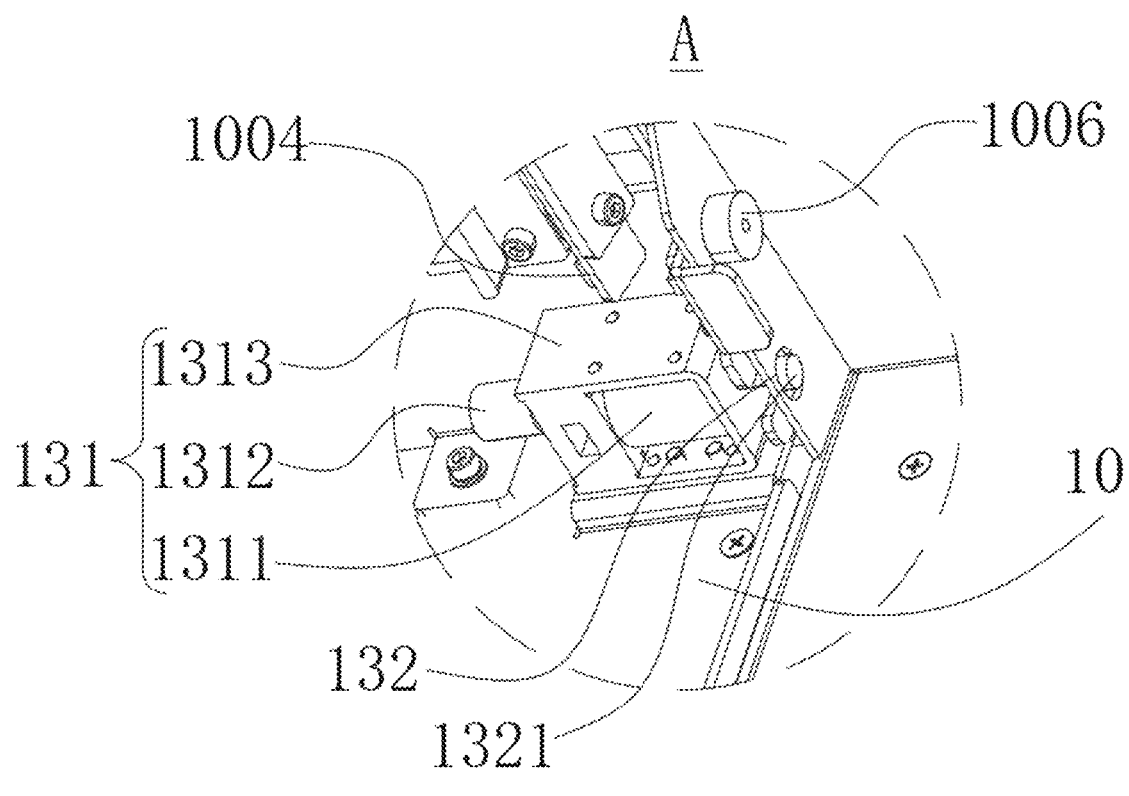
FIG. 4 is an enlarged schematic diagram of local region A illustrated in FIG. 3.

Referring to FIG. 3 and FIG. 4, the locking unit 1005 is disposed on at least one of the machine body 1001 or the blocking member 1003. The locking unit 1005 has a locked state, an unlocked state, and an abnormal state. When the blocking member 1003 is in the closed state and the locking unit 1005 is in the locked state, the blocking member 1003 is locked to the machine body 1001 by the locking unit 1005, that is, the blocking member 1003 remains being closed at the machine body 1001.

When the locking unit 1005 is in the unlocked state, the blocking member 1003 is movable relative to the machine body 1001. For example, through movement of the blocking member 1003 relative to the machine body 1001, the blocking member 1003 may be switched from the closed state to the open state, or the blocking member 1003 may be switched from the open state to the closed state.

The locking unit 1005 being in the abnormal state means that the locking unit 1005 is abnormal. The abnormal state of the locking unit 1005 includes two situations as follows. A current value of the locking unit 1005 is not greater than a preset value, and the locking unit 1005 is in the abnormal state. The current value of the locking unit 1005 is greater than the preset value, and the locking unit 1005 is in the abnormal state. On condition that the current value of the locking unit 1005 is not greater than the preset value and the locking unit 1005 is in the abnormal state, the locking unit 1005 cannot be switched to the locked state (that is, performing locking) when the locking unit 1005 is in the unlocked state, and/or the locking unit 1005 cannot be switched to the unlocked state when the locking unit 1005 is in the locked state.

On condition that the current value of the locking unit 1005 is not greater than the preset value and the locking unit 1005 is in the abnormal state, hardware of the locking unit 1005 is not damaged, and the locking unit 1005 can be adjusted to resume unlocking and locking operations. On condition that the current value of the locking unit 1005 is greater than the preset value, which means that the hardware of the locking unit 1005 is damaged, the locking unit 1005 may be automatically switched to the unlocked state by powering off the locking unit 1005.

Figure 5:
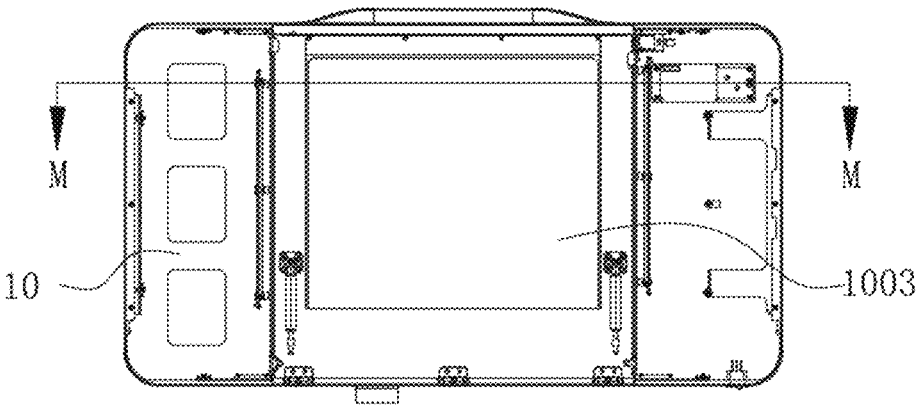
FIG. 5 is a bottom diagram of the machine housing illustrated in FIG. 3.
Figure 6:
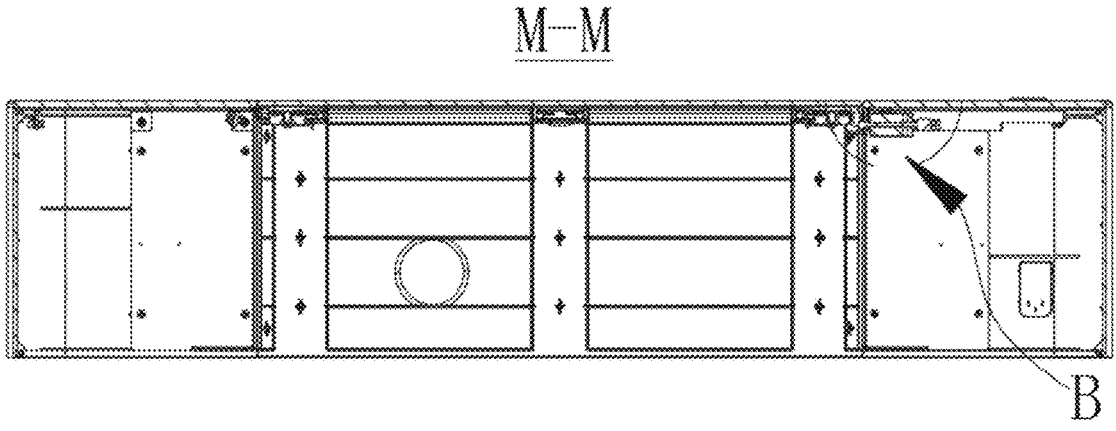
FIG. 6 is a cross-sectional diagram of the machine housing illustrated in FIG. 5, taken alone line M-M.
Figure 7:
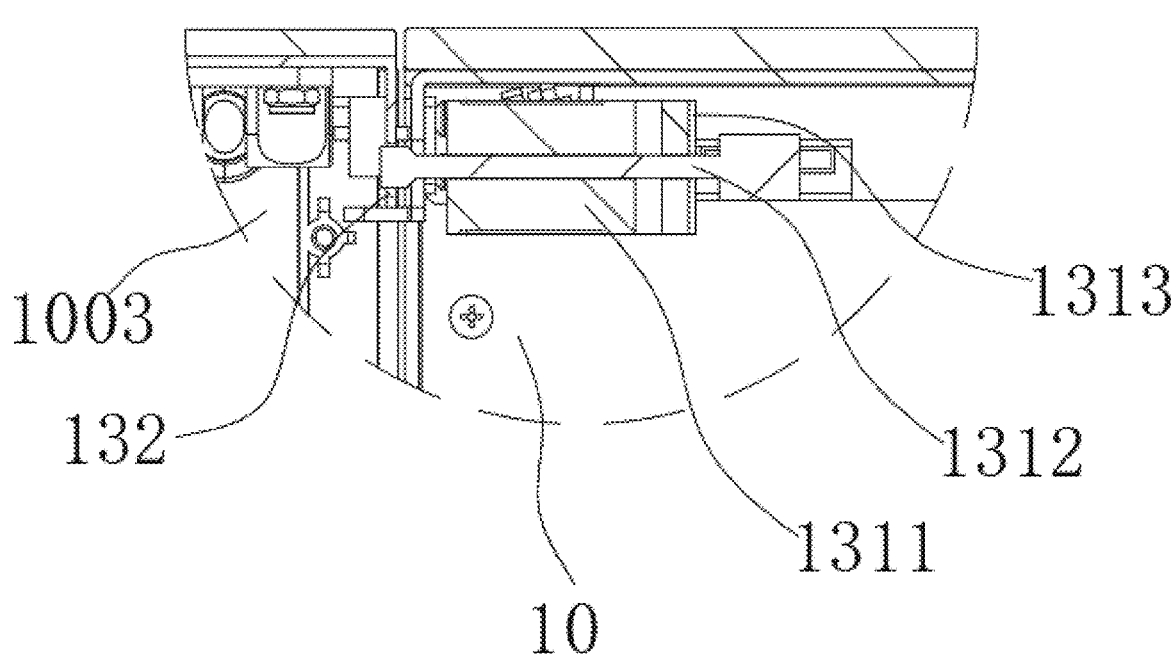
FIG. 7 is an enlarged schematic view of local region B illustrated in FIG. 6.

Referring to FIG. 5, FIG. 6, and FIG. 7, the locking unit 1005 includes a first locking portion 131 and a second locking portion 132 that are movable relative to each other. The first locking portion 131 is disposed on the machine body 1001. The second locking portion 132 is disposed on the blocking member 1003. A position to which the first locking portion 131 moves relative to the second locking portion 132 includes an unlocked position and a locked position. When the first locking portion 131 moves relative to the second locking portion 132 to the unlocked position, the locking unit 1005 is in the unlocked state. When the first locking portion 131 moves relative to the second locking portion 132 to the locked position, the locking unit 1005 is in the locked state. If the first locking portion 131 cannot move from the unlocked position to the locked position, the locking unit 1005 is in the abnormal state. If the first locking portion 131 cannot move from the locked position to the unlocked position, the locking unit 1005 is in the abnormal state.

In this implementation, the first locking portion 131 includes a driving body 1311, a retractable rod 1312, and a mounting seat 1313. The second locking portion 132 includes a locking hole 1321 defined on the blocking member 1003. The mounting seat 1313 is fixed to the machine body 1001 at a position of the doorframe bracket 111 close to the blocking member 1003. The driving body 1311 is fixed to the mounting seat 1313. The retractable rod 1312 is movably disposed on the mounting seat 1313. The retractable rod 1312 can pass into the locking hole 1321, so that the first locking portion 131 is locked and connected to the second locking portion 132. The driving body 1311 is configured to drive the retractable rod 1312 to move towards or away from the locking hole 1321, so that the locking unit 1005 is switched between the locked state and the unlocked state. When at least a part of the retractable rod 1312 passes into the locking hole 1321, the first locking portion 131 is located at the locked position relative to the second locking portion 132, and the locking unit 1005 is in the locked state. When the retractable rod 1312 is separated from the locking hole 1321, the locking unit 1005 is in the unlocked state. On condition that the locking unit 1005 is in the locked state, at least the part of the retractable rod 1312 passes into the locking hole 1321, and is limited by the locking hole 1321, thereby reducing the possibility that the retractable rod 1312 is separated from the blocking member 1003.

The second sensor 1006 is configured to sense the state of the locking unit 1005. In this implementation, the second sensor 1006 is disposed adjacent to the locking unit 1005.

Specifically, the second sensor 1006 may be a limiting switch. The limiting switch is a common small-current master switch, which uses the collision of the moving components of production machinery to actuate a contact of the limiting switch, thereby realizing the turn on or turn off the control circuit. In this implementation, the limiting switch is disposed below one end of the retractable rod 1312. It can be understood that, when the locking unit 1005 is in the unlocked state, the end of the retractable rod 1312 presses the limiting switch to turn on the limiting switch. When the laser machining device receives a turn-on signal of the limiting switch, it can be determined that the locking unit 1005 is in the unlocked state. When the locking unit 1005 is in the locked state, one end of the retractable rod 1312 is separated from the limiting switch to turn off the limiting switch. When the laser machining device receives a turn-off signal of the limiting switch, it can be determined that the locking unit 1005 is in the locked state. It can be understood that, in some possible embodiments of the present disclosure, the second sensor 1006 includes but is not limited to a photoelectric switch, a proximity switch, a Hall switch, etc., which is not limited in the present disclosure. In some other implementations, the second sensor 1006 may be omitted.

Referring to FIG. 1 again, the control system 1009 can support the laser machining device 100 to implement the control method provided in this implementation of the present disclosure. The control system 1009 is disposed on the machine body 1001. For example, the control system 1009 and the workbench 20 may be provided in an integrated manner. Alternatively, the control system 1009 and the machine body 1001 may be provided in a split manner, and the control system 1009 can be in wired or wireless communication with the machine body 1001. The first sensor 1004, the locking unit 1005, and the second sensor 1006 are in wired or wireless communication with the control system 1009, respectively.

The control system 1009 may be implemented in a form of a terminal device and/or a server. The terminal device may be, such as a mobile phone, a computer, a tablet computer, etc. The server may be a cloud server, etc.

The control system 1009 includes a processor 101, a memory 103, an interface circuit 105, an interaction unit 107, and a reminder apparatus 109. It can be understood that at least one of the processor 101, the memory 103, the interface circuit 105, or the interaction unit 107 is included in the present disclosure. The processor 101 is mainly configured to perform processing operations provided in this implementation of the present disclosure, for example, the processor 101 is configured to control the control system 1009, execute software programs, process data of the software programs, etc. The memory 103 is mainly configured to store software programs and data. Th interface circuit 105 may be configured to support communication for laser machining device 100. The interface circuit 105 may include a transceiver or an input/output interface. The interaction unit 107 may be configured to support man-machine interaction.

It may be understood that, for ease of description, only one memory 103 and one processor 101 are illustrated in FIG. 1. An actual control system 1009 may include one or more processors 101 and one or more memories 103. The memory 103 may also be referred to as a computer storage medium or a storage device. The memory 103 may be independent from the processor 101, or may be integrated with the processor 101, which is not limited in this implementation of the present disclosure.

Referring to FIG. 2 again, the interaction unit 107 is configured to implement input/output interaction between the control system 1009 and the user, and the specific form is related to the interaction manner. For example, the interaction unit 107 includes a push-button switch 1071. The push-button switch 1071 is disposed on the machine housing 10 of the machine body 1001, and is used for the user to trigger a machining instruction. The machining instruction includes a machining start instruction, a machining pause instruction, a machining stop instruction, a machining continue instruction, etc. When the user presses the push-button switch 1071, the machining instruction can be triggered. There may be multiple push-button switches 1071, so that it is convenient for the user to trigger different machining instructions. It can be understood that, there may also be one push-button switch 1071, as long as various machining instructions can be triggered.

The progress state of the machining task includes a pause state, a stop state, a complete state, and a continue state.

When the machining start instruction is triggered, the control system 1009 can control the machine body 1001 to start to perform a machining task.

During the machine body 1001 performing the machining task, if the machining pause instruction is triggered, the control system 1009 can control the machine body 1001 to pause the machining task, and the progress state of the machining task is the pause state.

During the machine body 1001 performing the machining task, if the machining stop instruction is triggered, the control system 1009 can control the machine body 1001 to stop the machining task, and the progress state of the machining task is the stop state.

If the machine body 1001 completes the machining task, the progress state of the machining task is the complete state.

When the progress state of the machining task is the pause state, if the machining continue instruction is triggered, the control system 1009 can control the machine body 1001 to continue the machining task, and the control system 1009 can control the progress state of the machining task to switch from the pause state to the continue state.

The interaction unit 107 may further include a touch display screen 1075. The user can touch the touch display screen 1075 to implement input/output interaction with the touch display screen 1075. If the interaction manner is implemented be means of air gesture recognition, the interaction unit 107 may include a camera, a millimeter-wave radar, or an ultrasonic sensor. If the interaction manner is implemented by means of semantic recognition, the interaction unit 107 may include a microphone and a loudspeaker. Alternatively, the interaction manner may also be a mixed manner of input and output, for example, the input is implemented through a microphone, and the output is implemented through a touch screen. Alternatively, there may also be various combinations of input and output manners, for example, an input manner includes a combination of a touch gesture and an air gesture, and/or an output manner includes various manners such as displaying and playing voice, sound, music, etc. through the display screen, which is not specifically limited in the present disclosure.

It can be understood that the interaction unit 107 may omit the push-button switch 1071, and the user can trigger various machining instructions through the touch display screen 1075. For example, multiple virtual keys of machining instructions are displayed on a virtual control interface of the touch display screen 1075. When the user touches one of the multiple virtual keys, a corresponding machining instruction is triggered. In addition, the touch display screen 1075 can output warning information for reminding the user.

It can be understood that the interaction unit 107 may omit the touch display screen 1075.

The reminder apparatus 109 is configured to output warning information, to remind the user that the laser machining device 100 is abnormal. In this implementation, the reminder apparatus 109 may include a warning lamp. The warning information includes warning light, such as red warning light. When the locking unit 1005 is in the abnormal state, the reminder apparatus 109 emits warning light. It can be understood that, the reminder apparatus 109 may further include a buzzer. The warning information may include a warning sound, such as a buzzer sound. The reminder apparatus 109 may further include a display screen, for example, the warning information may further include image information and/or letter symbol information, etc. The reminder apparatus and the warning information output by the reminder apparatus are not limited in the present disclosure. It can be understood that the reminder apparatus 109 may be omitted, and the warning information is output by the touch display screen 1075.

The processor 101 is configured to send a request for performing the machining task to the machine body 1001, so that the laser machining device 100 starts a laser machining flow. In this implementation, the processor 101 is configured to send a request for performing the machining task to the machine body 1001 by sending a Gcode file to the machine body 1001, so that the laser machining device 100 starts the laser machining flow.

The processor 1001 is further configured to send a locked instruction to the locking unit 1005, to control the locking unit 1005 to be switched from the unlocked state to the locked state (that is, the locking unit 1005 is locked). The processor 101 is further configured to send an unlocked instruction to the locking unit 1005, to control the locking unit 1005 to be switched from the locked state to the unlocked state (that is, the locking unit 1005 is unlocked).

The processor 1001 is further configured to control the locking unit 1005 to be in the unlocked state or the locked state, according to the state of the blocking member 1003 detected by the first sensor 1004 and/or the progress state of the machining task.

In this implementation, the processor 101 configured to control the locking unit 1005 to be in the unlocked state or the locked state, according to the state of the blocking member 1003 detected by the first sensor 1004, is further configured to control the locking unit 1005 to be in the locked state if the state of the blocking member 1003 is the closed state.

In this implementation, according to the fact that the first sensor 1004 detects that the blocking member 1003 is in the closed state, the processor 101 is configured to send the locked instruction to the locking unit 1005, to control the locking unit 1005 to be switched from the unlocked state to the locked state.

When the laser machining device 100 needs to perform laser machining, the machine body 1001 is closed by the blocking member 1003. When the first sensor 1004 detects that the machine body 1001 is in the closed state, the processor 101 sends the locked instruction to the locking unit 1005, so that the blocking member 1003 remains being closed at the machine body 1001. Since the blocking member 1003 is locked to the machine body 1001 by the locking unit 1005, the blocking member 1003 is prevented from being opened by the user during the laser machining of the laser machining device 100, and thus the laser light is prevented from spilling over the machining space. In this way, the risk that the user around the laser machining device 100 is hurt by the laser light is reduced, thereby further improving the machining safety of the laser machining device 100.

In this implementation, the processor 101 configured to control the locking unit 1005 to be in the unlocked state or the locked state, according to the progress state of the machining task, is further configured to control the locking unit 1005 to be in the unlocked state if the progress state of the machining task is any one of a pause state, a stop state, and a complete state.

In this implementation, the processor 101 configured to control the locking unit 1005 to be in the unlocked state or the locked state, according to the state of the blocking member 1003 detected by the first sensor 1004 and the progress state of the machining task, is further configured to control the locking unit 1005 to be in the locked state if the state of the blocking member 1003 is the closed state and the progress state of the machining task is a continue state.

In this implementation, after the locking unit 1005 is controlled to be in the locked state, the processor 1001 is further configured to control the second sensor 1006 to detect the state of the locking unit 1005. If the locking unit 1005 is in the locked state, the processor 1001 is further configured to control the machine body 1001 to perform the machining task. If the locking unit 1005 is in the unlocked state, the processor 1001 is further configured to control the reminder apparatus to output warning information.

If the locking unit 1005 is not locked, there is a risk that the blocking member 1003 is easily opened. After the processor 101 sends a locked instruction to the locking unit 1005, that is, on condition that the processor 101 controls the locking unit 1005 to be in the locked state, the locking unit 1005 may fail to be locked due to abnormality. In this implementation, on condition that the second sensor 1006 detects that the locking unit 1005 is in the locked state, the machine body 1001 is controlled to perform the machining task. Therefore, the possibility that the machine body 1001 starts to perform the machining task when the locking unit 1005 is not locked is reduced, thereby further improving the machining safety of the laser machining device 100.

After the processor 101 controls the locking unit 1005 to be in the locked state, if the locking unit 1005 is in the unlocked state, which means that the locking unit 1005 is not locked due to abnormality, the reminder apparatus 109 is controlled to output warning information to remind the user, thereby improving the use convenience of the laser machining device 100.

In this implementation, the processor 101 is further configured to send an unlocked instruction to the locking unit 1005 if the machining task of the machine body 1001 is completed, so as to control the locking unit 1005 to be switched from the locked state to the unlocked state. When the machining task of the machine body 1001 is completed, the progress state of the machining task is the complete state, and the locking unit 1005 is automatically switched from the locked state to the unlocked state, thereby improving the automation degree of the laser machining device 100.

In this implementation, the processor 101 is further configured to detect a current value of the locking unit 1005. If the current value of the locking unit 1005 is greater than the preset value, the processor 101 is configured to control the reminder apparatus 109 to output the warning information. The use of the locking unit 1005 is monitored by detecting the current value of the locking unit 1005. When the locking unit 1005 is abnormal, the warning information is output by the reminder apparatus 109 to remind the user, thereby improving the use convenience of the laser machining device 100.

The following describes a control method for a laser machining device 100 provided in this implementation. The control method may be executed by the processor 101.

Referring to FIG. 8, the control method for the laser machining device 100 includes the following.

At S101, the locking unit 1005 is controlled to be in an unlocked state or a locked state, according to a state of the blocking member 1003 detected by the first sensor 1004.

A locked instruction may be sent by the processor 101 to the locking unit 1005, to control the locking unit 1005 to be switched from the unlocked state to the locked state (that is, the locking unit 1005 is locked). An unlocked instruction may be sent by the processor 101 to the locking unit 1005, to control the locking unit 1005 to be switched from the locked state to the unlocked state (that is, the locking unit 1005 is unlocked).

Controlling the locking unit 1005 to be in the unlocked state or the locked state, according to the state of the blocking member 1003 detected by the first sensor 1004, includes the following. The locking unit 1005 is controlled to be in the locked state, in response to the state of the blocking member 1003 is the closed state.

The first sensor 1004 automatically detects that the blocking member 1003 is in the closed state, and the locking unit 1005 is controlled to be in a closed state. Therefore, the precise control is realized, and a situation that the user misjudges that the blocking member 1003 is closed but actually opened is avoided, thereby improving the safety of laser machining.

At S102, the second sensor 1006 is controlled to detect a state of the locking unit 1005.

At S103, after the locking unit 1005 is controlled to be in the locked state, the machine body 1001 is controlled to perform the machining task in response to the locking unit 1005 being in the locked state.

If the second sensor 1006 detects that the first locking portion 131 of the locking unit 1005 reaches a locked position, the locking unit 1005 is in the locked state, and the processor 101 controls the machine body 1001 to perform the machining task.

When the locking unit 1005 is not locked, there is a risk that the blocking member 1003 may be easily opened. The machine body 1001 is controlled to perform the machining task after the second sensor 1006 detects that the locking unit 1005 is in the locked state. Therefore, a possibility that the machine body 1001 starts to perform the machining task when the locking unit 1005 is not locked is reduced, thereby further improving the safety of laser machining.

At S104, after the locking unit is controlled to be in the locked state, the reminder apparatus 109 is controlled to output warning information in response to the locking unit 1005 being in the unlocked state.

After the locking unit 1005 receives the locked instruction, the first locking portion 131 does not move to the locked position. If the second sensor 1006 detects that the first locking portion 131 of the locking unit 1005 does not reach the locked position, that is, the locking unit 1005 is still in the unlocked state due to abnormality, the reminder apparatus 109 is controlled to output the warning information.

At S105, a current value of the locking unit 1005 is detected, and the reminder apparatus 109 is controlled to output the warning information in response to the current value of the locking unit 1005 being greater than a preset value.

The current value of the locking unit 1005 is greater than the preset value, and a hardware structure of the locking unit 1005 is damaged, so that an unlocking operation or a locking operation cannot be performed, and the locking unit 1005 is abnormal. S105 may be performed synchronously with S101 to S104.

After the locking unit 1005 is controlled to be in the locked state, if the current value of the locking unit 1005 is greater than the preset value, which means that the locking unit 1005 is abnormal, the warning information is output by the reminder apparatus 109, to remind the user that the locking unit 1005 is abnormal.

It can be understood that S102 to S105 may be omitted.

A control method for a laser machining device 100 is provided in another implementation of the present disclosure. The control method may be executed by the processor 101. Referring to FIG. 9, the control method includes the following.

At S201, the locking unit 1005 is controlled to be in the unlocked state or the locked state according to the progress state of the machining task.

The state of the locking unit 1005 is controlled according to the progress state of the machining task, rather than according to the sensor detection, so that the structure of the laser machining device 100 can be simplified.

Controlling the locking unit 1005 to be in the unlocked state or the locked state according to the progress state of the machining task, that is, S201, includes the following. The locking unit 1005 is controlled to be in the unlocked state, in response to the progress state of the machining task being any one of a pause state, a stop state, and a complete state.

During performing of the machining task by the machine body 1001, the locking unit 1005 is in the locked state.

If a machining pause instruction is triggered during the performing of the machining task by the machine body 1001, the processor 101 controls the machine body 1001 to pause the machining task, and the progress state of the machining task is a pause state. After the machining pause instruction is triggered, the locking unit 1005 is controlled to be switched from the locked state to the unlocked state. The unlocked instruction can be sent by the processor 101 to the locking unit 1005, so as to control the locking unit 1005 to be switched from the locked state to the unlocked state.

If a machining stop instruction is triggered during the performing of the machining task by the machine body 1001, the processor 101 controls the machine body 1001 to stop the machining task, the progress state of the machining task is a stop state, and the locking unit 1005 is controlled to be switched from the locked state to the unlocked state.

If the machining task is completed by the machine body 1001, the progress state of the machining task is a complete state, and the locking unit 1005 is controlled to be switched from the locked state to the unlocked state.

Controlling the locking unit 1005 to be in the unlocked state or the locked state according to the state of the blocking member 1003 detected by the first sensor 1004, that is, S201, includes the following. The locking unit 1005 is controlled to be in the locked state, in response to the state of the blocking member 1003 being the closed state.

Controlling the locking unit 1005 to be in the locked state, in response to the state of the blocking member 1003 being the closed state and the progress state of the machining task being the continue state, includes the following.

At S2011, the progress state of the machining task is controlled to be the continue state, in response to the state of the blocking member 1003 being the closed state, the locking unit 1005 being in the unlocked state, and the machining progress being in the pause state.

At S2012, the locking unit 1005 is controlled to be in the locked state.

At S202, the second sensor 1006 is controlled to detect state of the locking unit 1005.

At S203, after the locking unit 1005 is controlled to be in the locked state, the machine body 1001 is controlled to perform the machining task in response to the locking unit 1005 being in the locked state.

If the second sensor 1006 detects that the first locking portion 131 of the locking unit 1005 reaches a locked position, the locking unit 1005 is in the locked state, and the processor 101 controls the machine body 1001 to perform the machining task.

At S204, after the locking unit 1005 is controlled to be in the locked state, the reminder apparatus 109 is controlled to output warning information in response to the locking unit 1005 being in the unlocked state.

After the locking unit 1005 receives the locked instruction, the first locking portion 131 does not move to the locked position. If the second sensor 1006 detects that the first locking portion 131 of the locking unit 1005 does not reach the locked position, that is, the locking unit 1005 is still in the unlocked state due to abnormality, the reminder apparatus 109 is controlled to output the warning information.

At S205, a current value of the locking unit 1005 is detected, and the reminder apparatus 109 is controlled to output the warning information in response to the current value of the locking unit 1005 being greater than the preset value.

The current value of the locking unit 1005 is greater than the preset value, and a hardware structure of the locking unit 1005 is damaged, so that an unlocking operation or a locking operation cannot be performed, and the locking unit 1005 is abnormal.

It can be understood that S202 to S205 may be omitted.

Referring to FIG. 10, a control method for the foregoing laser machining device 100 is provided in yet another implementation of the present disclosure, and includes the following.

At S301, a request for performing a machining task is sent to the machine body 1001, and a laser machining flow of a laser machining device 100 starts.

At S303, it is determined whether the blocking member 1003 is in a closed state, according to the state of the machine body 1001 detected by the first sensor 1004. In this implementation, if yes (Y), that is, it is determined that the blocking member 1003 is in the closed state, and the process proceeds to S30. If no (N), that is, it is determined that the blocking member 1003 is in the open state, the process returns to S301, and the laser machining device 100 restarts the laser machining flow.

It can be understood that, in other implementations of the present disclosure, when it is determined that the blocking member 1003 is in the open state or the closed state, S303 may be repeated.

It can be understood that, in other implementations of the present disclosure, after S303 and before S305, the control method may further include the following. The reminder apparatus 109 is controlled to output warning information, to remind the user that the machine body 1001 is not closed by the blocking member 1003.

At S305, it is determined whether the interaction unit 107 is triggered with a machining start instruction. If yes (Y), that is, it is determined that the interaction unit 107 is triggered with the machining start instruction, and the process proceeds to S307. If no (N), it is determined that the interaction unit 107 is not triggered with the machining start instruction, the process returns to step S301, and the laser machining device 100 restarts the laser machining flow.

In this implementation, it is determined whether the interaction unit 107 is triggered with the machining start instruction in a preset period. For example, it is determined whether the push-button switch 1071 is pressed in the preset period, and if the push-button switch 1071 is pressed, it is considered that the machining start instruction is triggered.

It can be understood that, in other implementations of the present disclosure, if it is determined that the interaction unit 107 is not triggered with the machining start instruction, the process returns to S303.

At S307, a locked instruction is sent to the locking unit 1005 to control the locking unit 1005 to be switched from the unlocked state to the locked state, and the blocking member 1003 remains being closed at the machine body 1001.

S307 may further includes the following. The laser machining apparatus 40 is controlled to move from an initial position to a preset machining position.

At S309, it is determined whether the locking unit 1005 is in the locked state according to the state of the locking unit 1005 detected by the second sensor 1006. If yes (Y), that is, it is determined that the locking unit 1005 is in the locked state, the process proceeds to S311. If no (N), that is, it is determined that the locking unit 1005 is in an abnormal state, the process proceeds to S325.

In this implementation, if the second sensor 1006 detects that the first locking portion 131 does not reach the locked position, the second sensor 1006 detects that the locking unit 1005 is in the abnormal state. If the second sensor 1006 detecting that the locking unit 1005 is in the abnormal state, it is determined that the locking unit 1005 is in the abnormal state.

At S311, the machine body 1001 is controlled to start to perform the machining task. The machine body 1001 starting to perform the machining task includes the following. The laser machining apparatus 40 emits laser light to perform laser machining on a workpiece.

Figure 10A:
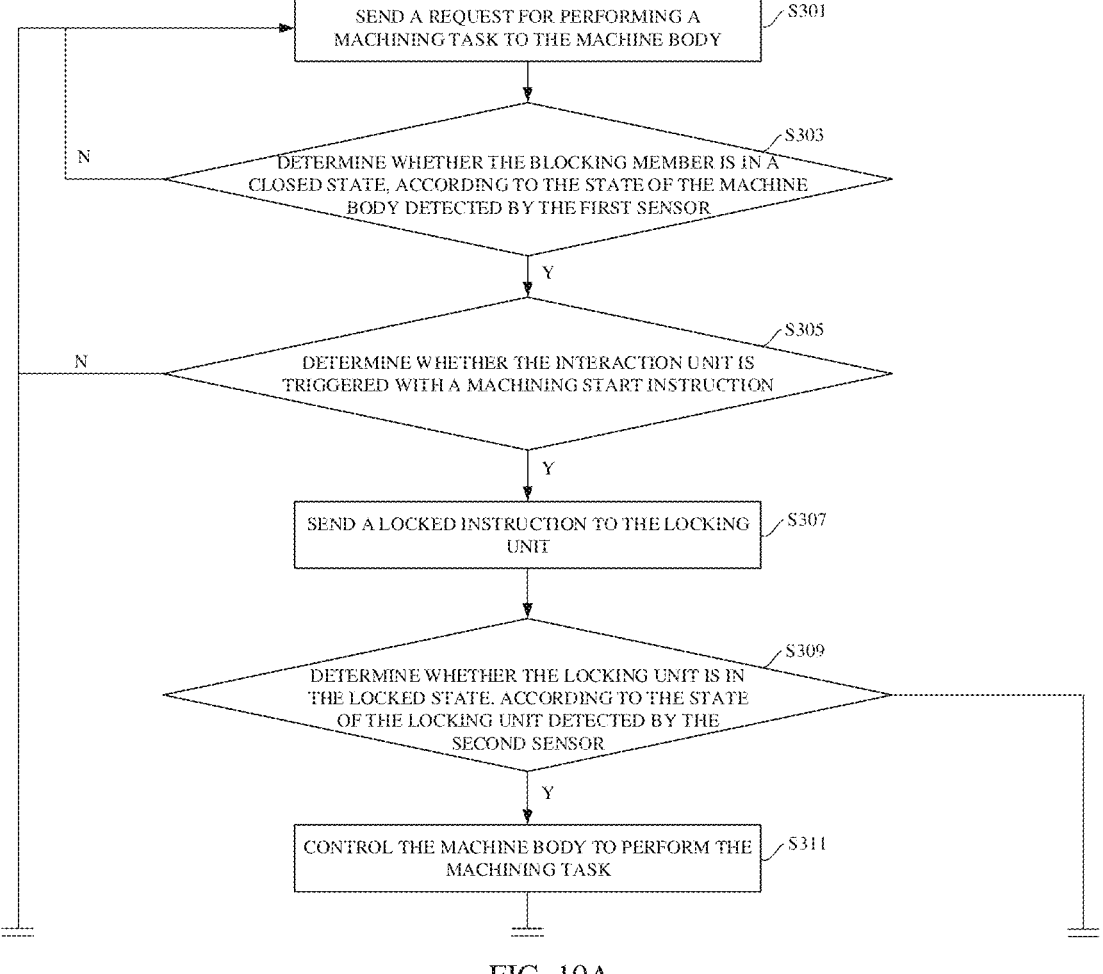
FIG. 10A is a flowchart of a control method for a laser machining device provided in yet another implementation of the present disclosure.
Figure 10B:
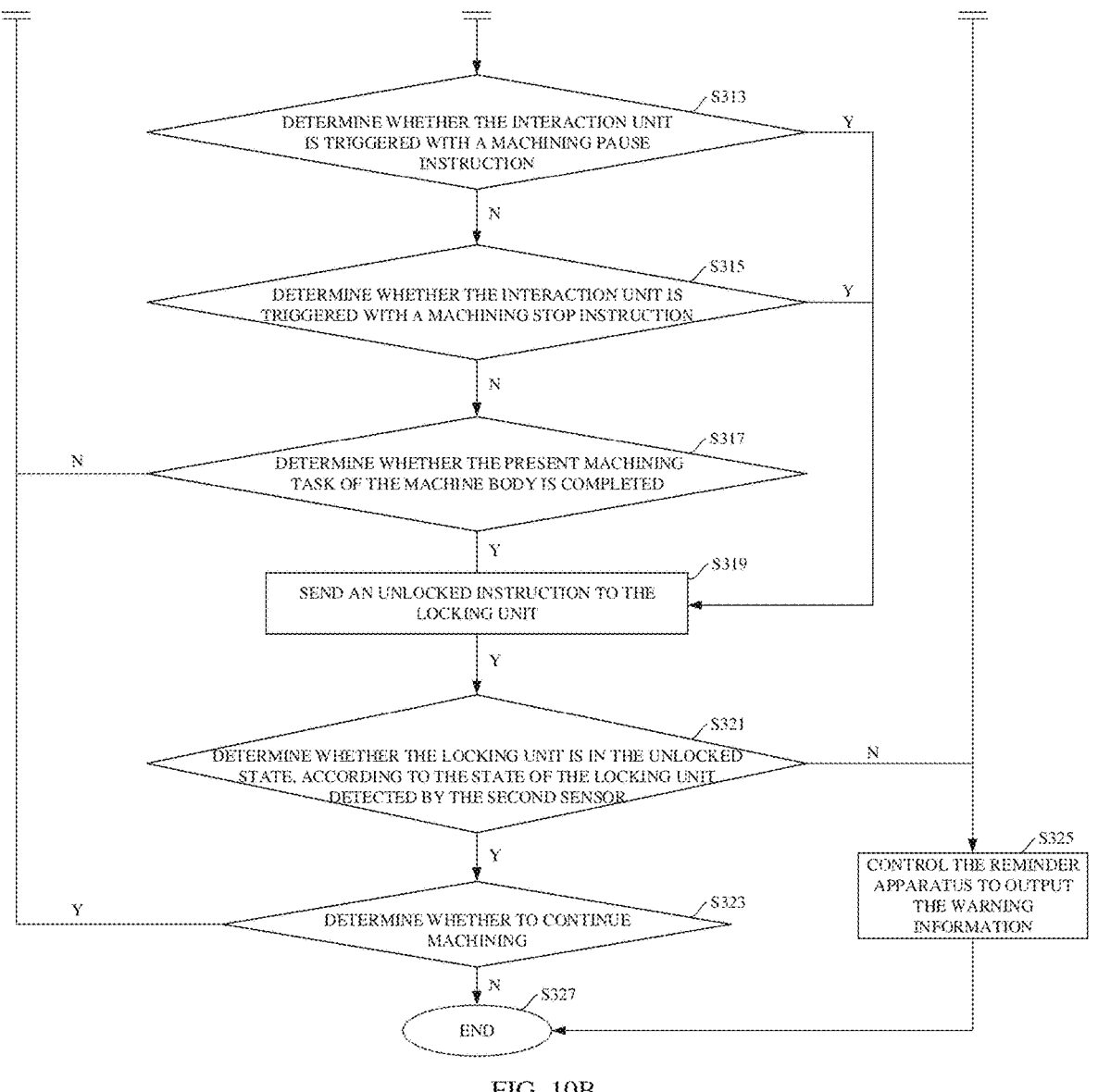
FIG. 10B is a flowchart of a control method for a laser machining device provided in yet another implementation of the present disclosure.

Referring to FIG. 10B, the control method for the foregoing laser machining device 100 as provided in FIG. 10A of the present disclosure continues as follows.

At S313, it is determined whether the interaction unit 107 is triggered with a machining pause instruction. If yes (Y), the process proceeds to S319. If yes (Y), the progress state of the machining task is a pause state, the present machining task of the machine body 1001 is paused, and the machine body 1001 pauses performing of the machining task. The control body 1001 pausing the performing of the machining task includes the following. The laser machining apparatus 40 is controlled to stop emitting laser light. After the machine body 1001 is paused for a period of time, the machine body 1001 can resume the present machining task.

In this implementation, during the performing of the machining task by the machine body 1001, if the push-button switch 1071 is pressed short, it is determined that the interaction unit 107 is triggered with the machining pause instruction.

It can be understood that, after the machine body 1001 is paused for a preset period, on condition that the blocking member 1003 is in the closed state and the locking unit 1005 is in the locked state, the process may proceed to S315. That is, the machine body 1001 automatically resumes (continues) to perform the present machining task, and the progress state of the machining task is automatically switched from the pause state to the continue state.

It can be understood that, after the machine body 1001 is paused from performing the machining task a period of time, on condition that the blocking member 1003 is in the closed state and the locking unit 1005 is in the locked state, if a machining continue instruction of the interaction unit 107 is triggered, the progress state of the machining task is switched from the pause state to the continue state, and the machine body 1001 can continue to perform the machining task paused.

At S315, it is determined whether the interaction unit 107 is triggered with a machining stop instruction. If yes (Y), the process proceeds to S319. If no (N), the process proceeds to S317.

In this implementation, during the performing of the machining task by the machine body 1001, if the push-button switch 1071 is pressed long, it is determined that the interaction unit 107 is triggered with the machining stop instruction, and the progress state of the machining task is a stop state. The progress state of the machining task being the stop state refers to that the laser machining device 100 ends the present laser machining flow. A period in which the push-button switch 1071 is pressed long is longer than a period in which the push-button switch 1071 is pressed short.

It can be understood that, on condition that the progress state of the machining task is the stop state, the blocking member 1003 is in the closed state, and the locking unit 1005 is in the locked state, if the machining continue instruction of the interaction unit 107 is triggered, the machine body 1001 can be controlled to continue to perform a new round of machining task.

At S317, it is determined whether the present machining task of the machine body 1001 is completed. If yes (Y), the process proceeds to S319. If no (N), the process returns to S301.

In other implementations of the present disclosure, if no (N), the process may return to one of S311, S313, and S315.

At S319, an unlocked instruction is sent to the locking unit 1005, to control the locking unit 1005 to be switched from the locked state to the unlocked state (that is, the locking unit 1005 is unlocked). After the locking unit 1005 is switched to the unlocked state, the blocking member 1003 can be opened relative to the machine body 1001.

At S321, it is determined whether the locking unit 1005 is in the unlocked state, according to the state of the locking unit 1005 detected by the second sensor 1006. If yes (Y), the process proceeds to S323. If no (N), that is, it is determined that the locking unit 1005 is in the abnormal state, and the process proceeds to S325.

If the second sensor 1006 detects that the first locking portion 131 reaches the unlocked position (that is, it is determined as Y), it is determined that the locking unit 1005 is in the unlocked state, and the process proceeds to S323. If the second sensor 1006 detects that the first locking portion 131 does not reach the unlocked position (that is, it is determined as N), it is determined that the locking unit 1005 is in the abnormal state, and the process proceeds to S325.

At S323, it is determined whether to continue machining. In this implementation, it is determined whether the interaction unit 107 is triggered with the machining continue instruction. If yes (Y), the process returns to S301, otherwise proceeds to S327. It can be understood that, in other implementations of the present disclosure, it is determined to continue machining according to the progress state of the machining task being a complete state.

At S325, the reminder apparatus 109 is controlled to output the warning information.

At S327, the present laser machining flow is ended.

It can be understood that, the foregoing operations are not limited to being performed in sequence. Some operations may be performed simultaneously or performed in reverse sequence. For example, an order of S313 and S315 may be exchanged. Some operations may be omitted. For example, S313, S315, and S323 may be omitted.

A control method for a laser machining device 100 is provided in yet another implementation of the present disclosure. The control method may be executed by a processor 101. The control method includes the following. A locking unit is controlled to be in the unlocked state or the locked state, according to a state of a blocking member detected by a first sensor and/or a progress state of a machining task.

Controlling the locking unit to be in the unlocked state or the locked state, according to the state of the blocking member detected by the first sensor, includes the following. The locking unit is controlled to be in the locked state, in response to the state of the blocking member being the closed state.

Controlling the locking unit to be in the unlocked state or the locked state, according to the progress state of the machining task, includes the following. The locking unit is controlled to be in the unlocked state, in response to the progress state of the machining task being any one of a pause state, a stop state, and a complete state.

Controlling the locking unit to be in the unlocked state or the locked state, according to the state of the blocking member detected by the first sensor and the progress state of the machining task, includes the following. The locking unit is controlled to be in the locked state, in response to the state of the blocking member being the closed state and the progress state of the machining task being a continue state.

After controlling the locking unit to be in the locked state, the control method further includes the following. A second sensor is controlled to detect a state of the locking unit. The machine body is controlled to perform the machining task, in response to the locking unit being in the locked state. A reminder apparatus is controlled to output warning information, in response to the locking unit being in the unlocked state.

The control method further includes the following. A current value of the locking unit is detected. A reminder apparatus is controlled to output warning information, in response to the current value of the locking unit being greater than a preset value.

By means of the control method in the present disclosure, the locking unit is controlled according to the state of the blocking member detected by the first sensor and/or the progress state of the machining task. On one hand, during the machining by the laser machining device, it is ensured that the blocking member is in the closed state by controlling the locking unit to be in the locked state, so that the user is prevented from opening the blocking member during the machining, and the laser light is prevented from spilling over, thereby not affecting the safety of the user. On the other hand, according to the progress state of the corresponding task, on condition that the laser light is ensured to not spill over, the machine can automatically control the locking unit to be in the unlocked state, thereby improving the convenience of interaction between the user and the device. Further, in the control method in the present disclosure, the state of the locking unit is detected in real time by the second sensor. When the locking unit is abnormal, the user can be reminded in time, thereby further improving the safety of the laser machining device, and further guaranteeing the safety of the user.

A computer-readable storage medium is provided in an implementation of the present disclosure. The storage medium is configured store at least one program instruction or code. When the at least one program instruction or code is loaded and executed by a processor, the at least one program instruction or code enables a computer to implement the foregoing control method.

The above are some implementations of the present disclosure. It may be noted that, those of ordinary skill in the art may further make several improvements and modifications without departing from the principle of the present disclosure, and these improvements and modifications are also regarded as the scope of protection of the present disclosure.

What is claimed is:

1. A control method for a laser machining device, wherein the laser machining device has a machining space defined therein, the laser machining device comprises a blocking member, a machine body, and a locking unit, the machine body is configured to perform a machining task, the machining space is defined by the machine body and the blocking member, the blocking member has an open state and a closed state, the locking unit is disposed on at least one of the machine body or the blocking member, the locking unit has an unlocked state and a locked state, the blocking member is switchable between the open state and the closed state when the locking unit is in the unlocked state, and the blocking member is in the closed state when the locking unit is in the locked state; and the control method comprises:

controlling the locking unit to be in the unlocked state or the locked state, according to a state of the blocking member detected by a first sensor and/or a progress state of the machining task;

wherein after controlling the locking unit to be in the locked state, the control method further comprises:

controlling a second sensor to detect a state of the locking unit; and controlling the machine body to perform the machining task, in response to the locking unit being in the locked state;

wherein after controlling the machine body to perform the machining task in response to the locking unit being in the locked state, the control method further comprises:

sending an unlocked instruction to the locking unit, in response to an interaction unit of the laser machining device being triggered with a machining pause instruction;

sending the unlocked instruction to the locking unit, in response to the interaction unit being triggered with a machining stop instruction;

determining whether the machining task is completed, in response to the interaction unit being not triggered with the machining pause instruction and the machining stop instruction; and sending unlocked instruction to the locking unit, in response to the machining task being completed.

2. The control method of claim 1, wherein controlling the locking unit to be in the unlocked state or the locked state, according to the state of the blocking member detected by the first sensor and the progress state of the machining task comprises:

controlling the locking unit to be in the locked state, in response to the state of the blocking member being the closed state and the progress state of the machining task being a continue state.

3. The control method of claim 1, wherein after controlling the locking unit to be in the locked state, the control method further comprises:

controlling a reminder apparatus to output warning information, in response to the locking unit being in the unlocked state.

4. The control method of claim 1, further comprising:

detecting a current value of the locking unit, and controlling a reminder apparatus to output warning information in response to the current value of the locking unit being greater than a preset value.

5. The control method of claim 1, wherein controlling the locking unit to be in the unlocked state or the locked state, according to the state of the blocking member detected by the first sensor and/or the progress state of the machining task comprises:

determining whether an interaction unit of the laser machining device is triggered with a machining start instruction, in response to the state of the blocking member being the closed state; and sending a locked instruction to the locking unit, in response to the interaction unit being triggered with the machining start instruction.

6. The control method of claim 1, wherein controlling the locking unit to be in the unlocked state or the locked state, according to the state of the blocking member detected by the first sensor comprises:

controlling the locking unit to be in the locked state, in response to the state of the blocking member being the closed state.

7. The control method of claim 1, wherein controlling the locking unit to be in the unlocked state or the locked state, according to the progress state of the machining task comprises:

controlling the locking unit to be in the unlocked state, in response to the progress state of the machining task being any one of a pause state, a stop state, and a complete state.

8. The control method of claim 1, wherein the locking unit comprises a first locking portion and a second locking portion that are movable relative to each other, the first locking portion is disposed on the machine body, the second locking portion is disposed on the blocking member, a position to which the first locking portion moves relative to the second locking portion comprises an unlocked position and a locked position, and the control method further comprises:

controlling the second sensor to detect a position of the first locking portion relative to the second locking portion;

determining the locking unit to be in the unlocked state, in response to the first locking portion moving relative to the second locking portion to the unlocked position; and determining the locking unit to be in the locked state, in response to the first locking portion moving relative to the second locking portion to the locked position.

9. A laser machining device, wherein a machining space is defined in the laser machining device, and the laser machining device comprises a blocking member, a machine body, a first sensor, a locking unit, and a processor, wherein the blocking member has an open state and a closed state;

the machine body is configured to perform a machining task;

the machining space is defined by the machine body and the blocking member; the first sensor is disposed on the machine body and configured to detect whether the blocking member is in the open state or the closed state;

the locking unit is disposed on at least one of the machine body or the blocking member, the locking unit has an unlocked state and a locked state, the blocking member is switchable between the open state and the closed state when the locking unit is in the unlocked state, the blocking member is in the closed state when the locking unit is in the locked state, the locking unit comprises a first locking portion and a second locking portion that are movable relative to each other, the first locking portion is disposed on the machine body, and the second locking portion is disposed on the blocking member;

the processor is electrically connected to the first sensor and the locking unit, and the processor is configured to:

control the locking unit to be in the unlocked state or the locked state, according to a state of the blocking member detected by the first sensor and/or a progress state of the machining task;

a position to which the first locking portion moves relative to the second locking portion comprises an unlocked position and a locked position;

the locking unit is in the unlocked state, in response to the first locking portion moving relative to the second locking portion to the unlocked position; and the locking unit is in the locked state and the blocking member is closed at the machine body, in response to the first locking portion moving relative to the second locking portion to the locked position.

10. The laser machining device of claim 9, further comprising an interaction unit connected to both the processor and the machine body, wherein the interaction unit is used for a user to trigger a machining instruction, and the processor is further configured to control the progress state of the machining progress according to the machining instruction.

11. The laser machining device of claim 10, wherein after controlling the locking unit to be in the locked state, the processor is further configured to:

control a second sensor to detect a state of the locking unit;

control the machine body to perform the machining task, in response to the locking unit being in the locked state; and control a reminder apparatus to output warning information, in response to the locking unit being in the unlocked state.

12. The laser machining device of claim 9, wherein the machine body comprises a workbench and a machine housing, an opening is defined on the machine housing, and the blocking member in the closed state fully covers the opening; and the laser machining device further comprises a second sensor, and the second sensor is electrically connected to the processor and configured to detect whether the locking unit is in the unlocked state or the locked state.

13. The laser machining device of claim 9, wherein the processor configured to control the locking unit to be in the unlocked state or the locked state, according to the state of the blocking member detected by the first sensor and the progress state of the machining task is configured to:

control the locking unit to be in the locked state, in response to the state of the blocking member being the closed state and the progress state of the machining task being a continue state.

14. The laser machining device of claim 7, further comprising a reminder apparatus, wherein the processor is further configured to:

detect a current value of the locking unit, and control the reminder apparatus to output warning information in response to the current value of the locking unit being greater than a preset value.

15. The laser machining device of claim 9, wherein the processor configured to control the locking unit to be in the unlocked state or the locked state, according to the state of the blocking member detected by the first sensor is configured to:

control the locking unit to be in the locked state, in response to the state of the blocking member being the closed state.

16. The laser machining device of claim 9, wherein the processor configured to control the locking unit to be in the unlocked state or the locked state, according to the progress state of the machining task is configured to:

control the locking unit to be in the unlocked state, in response to the progress state of the machining task being any one of a pause state, a stop state, and a complete state.

17. The laser machining device of claim 9, wherein after controlling the locking unit to be in the locked state, the processor is further configured to:

control a second sensor to detect a state of the locking unit;

control the machine body to perform the machining task, in response to the locking unit being in the locked state;

send an unlocked instruction to the locking unit, in response to an interaction unit of the laser machining device being triggered with a machining pause instruction;

send the unlocked instruction to the locking unit, in response to the interaction unit being triggered with a machining stop instruction;

determine whether the machining task is completed, in response to the interaction unit being not triggered with the machining pause instruction and the machining stop instruction; and send unlocked instruction to the locking unit, in response to the machining task being completed.

18. The laser machining device of claim 9, wherein the first locking portion comprises a driving body and a retractable rod connected to the driving body, the driving body is fixed to the machine body, the driving body is configured to drive the retractable rod to move towards or away from the second locking portion, and the second locking portion comprises a locking hole defined on the blocking member; and a position to which the retractable rod moves relative to the second locking portion comprises the unlocked position and the locked position; at least a part of the retractable rod passes into the locking hole and the locking unit is in the locked state, in response to the retractable rod extending to the locked position; and the locking unit is in the unlocked state, in response to the retractable rod retracting to the unlocked position.

19. A non-transitory computer-readable storage medium configured to store at least one program instruction or code which, when loaded and executed by a processor, enables a computer to implement controlling the locking unit to be in an unlocked state or a locked state, according to a state of the blocking member detected by a first sensor and/or a progress state of the machining task;

wherein after controlling the locking unit to be in the locked state, the at least one program instruction or code which, when loaded and executed by the processor, enables the computer to further implement:

controlling a second sensor to detect a state of the locking unit; and controlling the machine body to perform the machining task, in response to the locking unit being in the locked state;

wherein after controlling the machine body to perform the machining task in response to the locking unit being in the locked state, the at least one program instruction or code which, when loaded and executed by the processor, enables the computer to further implement:

sending an unlocked instruction to the locking unit, in response to an interaction unit of the laser machining device being triggered with a machining pause instruction;

sending the unlocked instruction to the locking unit, in response to the interaction unit being triggered with a machining stop instruction;

determining whether the machining task is completed, in response to the interaction unit being not triggered with the machining pause instruction and the machining stop instruction; and sending unlocked instruction to the locking unit, in response to the machining task being completed.

20. The non-transitory computer-readable storage medium of claim 19, wherein the at least one program instruction or code enabling the computer to implement controlling the locking unit to be in the unlocked state or the locked state, according to a state of the blocking member detected by a first sensor and/or a progress state of the machining task enables the computer to implement:

controlling the locking unit to be in the locked state, in response to the state of the blocking member being a closed state;

controlling the locking unit to be in the unlocked state, in response to the progress state of the machining task being any one of a pause state, a stop state, and a complete state; and controlling the locking unit to be in the locked state, in response to the state of the blocking member being the closed state and the progress state of the machining task being a continue state.

21. A control method for a laser machining device, wherein the laser machining device has a machining space defined therein, the laser machining device comprises a blocking member, a machine body, and a locking unit, the machine body is configured to perform a machining task, the machining space is defined by the machine body and the blocking member, the blocking member has an open state and a closed state, the locking unit is disposed on at least one of the machine body or the blocking member, the locking unit has an unlocked state and a locked state, the blocking member is switchable between the open state and the closed state when the locking unit is in the unlocked state, and the blocking member is in the closed state when the locking unit is in the locked state; the locking unit comprises a first locking portion and a second locking portion that are movable relative to each other, the first locking portion is disposed on the machine body, and the second locking portion is disposed on the blocking member; a position to which the first locking portion moves relative to the second locking portion comprises an unlocked position and a locked position; and the control method comprises:

controlling the locking unit to be in the unlocked state or the locked state, according to a state of the blocking member detected by a first sensor and/or a progress state of the machining task; and determining a state of the locking unit, according to a position of the first locking portion relative to the second locking portion.

22. The control method of claim 21, wherein determining the state of the locking unit, according to the position of the first locking portion relative to the second locking portion comprises:

controlling a second sensor to detect the position of the first locking portion relative to the second locking portion;

determining the locking unit to be in the unlocked state, in response to the first locking portion moving relative to the second locking portion to the unlocked position; and determining the locking unit to be in the locked state, in response to the first locking portion moving relative to the second locking portion to the locked position.

23. A laser machining device, wherein a machining space is defined in the laser machining device, and the laser machining device comprises a blocking member, a machine body, a first sensor, a locking unit, an interaction unit, a second sensor, and a processor, wherein the blocking member has an open state and a closed state;

the machine body is configured to perform a machining task;

the machining space is defined by the machine body and the blocking member; the first sensor is disposed on the machine body and configured to detect whether the blocking member is in the open state or the closed state;

the locking unit is disposed on at least one of the machine body or the blocking member, the locking unit has an unlocked state and a locked state, the blocking member is switchable between the open state and the closed state when the locking unit is in the unlocked state, and the blocking member is in the closed state when the locking unit is in the locked state;

the second sensor is configured to detect a state of the locking unit; and the processor is electrically connected to the first sensor and the locking unit, and the processor is configured to:

control the locking unit to be in the unlocked state or the locked state, according to a state of the blocking member detected by the first sensor and/or a progress state of the machining task;

control the second sensor to detect the state of the locking unit, after controlling the locking unit to be in the locked state;

control the machine body to perform the machining task, in response to the locking unit being in the locked state;

after controlling the machine body to perform the machining task in response to the locking unit being in the locked state, the processor is further configured to:

send an unlocked instruction to the locking unit, in response to the interaction unit of the laser machining device being triggered with a machining pause instruction;

send the unlocked instruction to the locking unit, in response to the interaction unit being triggered with a machining stop instruction;

determine whether the machining task is completed, in response to the interaction unit being not triggered with the machining pause instruction and the machining stop instruction; and send unlocked instruction to the locking unit, in response to the machining task being completed.

24. The laser machining device of claim 23, wherein in terms of controlling the locking unit to be in the unlocked state or the locked state, according to the state of the blocking member detected by the first sensor and/or a progress state of the machining task, the processor is configured to:

control the locking unit to be in the unlocked state, in response to the progress state of the machining task being any one of a pause state, a stop state, and a complete state; or control the locking unit to be in the locked state, in response to the state of the blocking member being the closed state and the progress state of the machining task being a continue state.

\* \* \* \* \*